United States Patent [19]
Daley

[11] Patent Number: 5,083,453
[45] Date of Patent: Jan. 28, 1992

[54] LINKAGE FOR VEHICLE SIMULATOR

[75] Inventor: Joseph W. Daley, Minnetonka, Minn.

[73] Assignee: MTS Systems Corporation, Eden Prairie, Minn.

[21] Appl. No.: 473,354

[22] Filed: Feb. 1, 1990

[51] Int. Cl.$^5$ .......................................... G01M 15/00
[52] U.S. Cl. ................................................ 73/118.1
[58] Field of Search ................... 73/118.1, 865.6, 669; 74/67, 68, 96, 110, 105

[56] References Cited

U.S. PATENT DOCUMENTS

| | | | |
|---|---|---|---|
| 3,028,761 | 4/1962 | Cole, Jr. | 74/68 |
| 4,567,782 | 2/1986 | Speicher et al. | 74/96 |
| 4,733,558 | 3/1988 | Grenier | 73/118.1 |
| 4,977,791 | 12/1990 | Erichsen | 74/96 |

*Primary Examiner*—Robert Raevis
*Attorney, Agent, or Firm*—Kinney & Lange

[57] ABSTRACT

A vehicle spindle test fixture that permits applying a brake load torque to the spindle or test unit has a loading actuator that will permit high input force levels, while keeping the coupled mass that must be moved during the test operation at a reasonably low level. In testing a vehicle spindle ideally, the mass carried by the test spindle would be equal to the wheel and tire. Because of larger physical sizes, the linkage design problem has become more difficult. The present invention reduces the total coupled mass for brake torque testing by utilizing a unique linkage arrangement that reduces the size of the input used for brake torque.

12 Claims, 2 Drawing Sheets

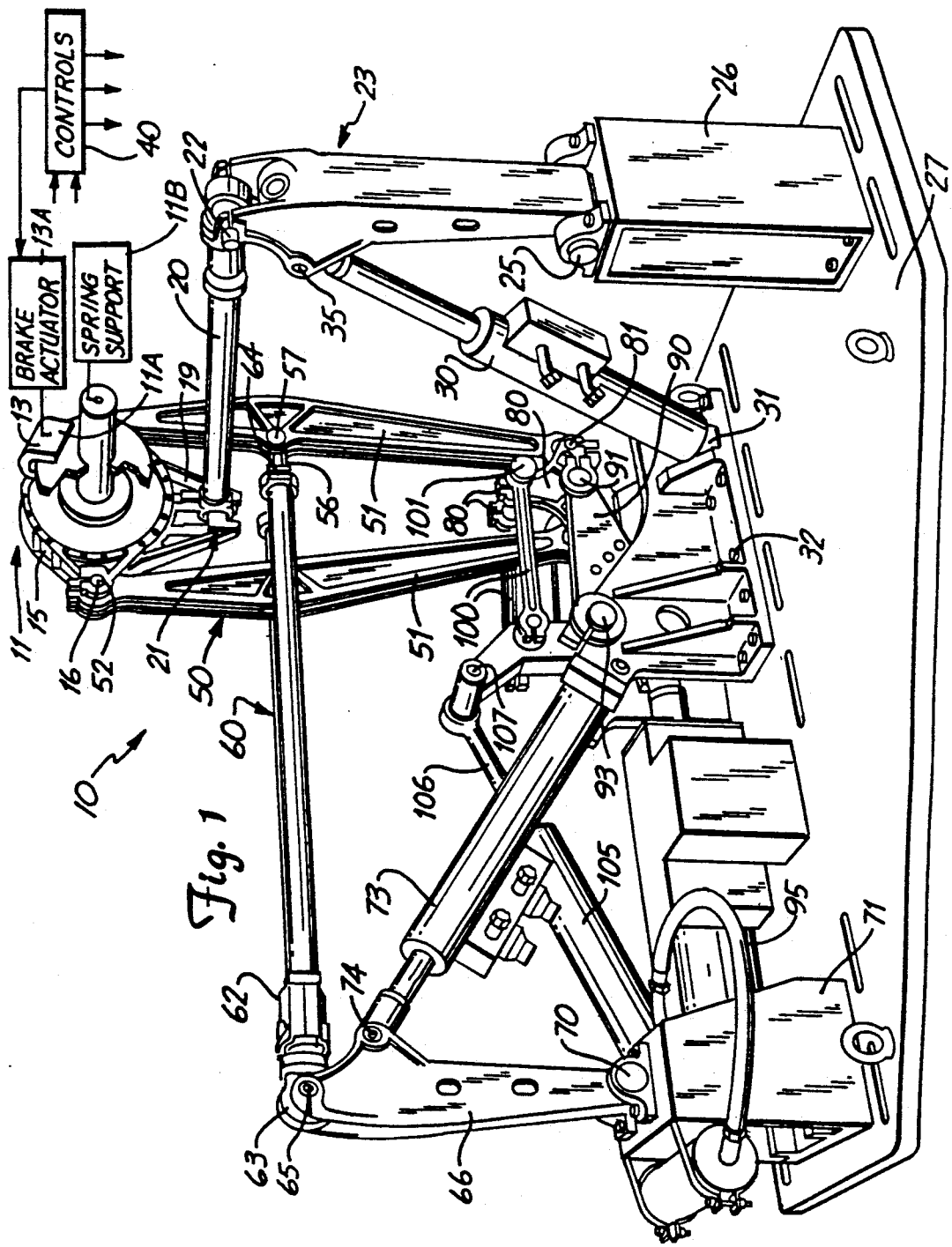

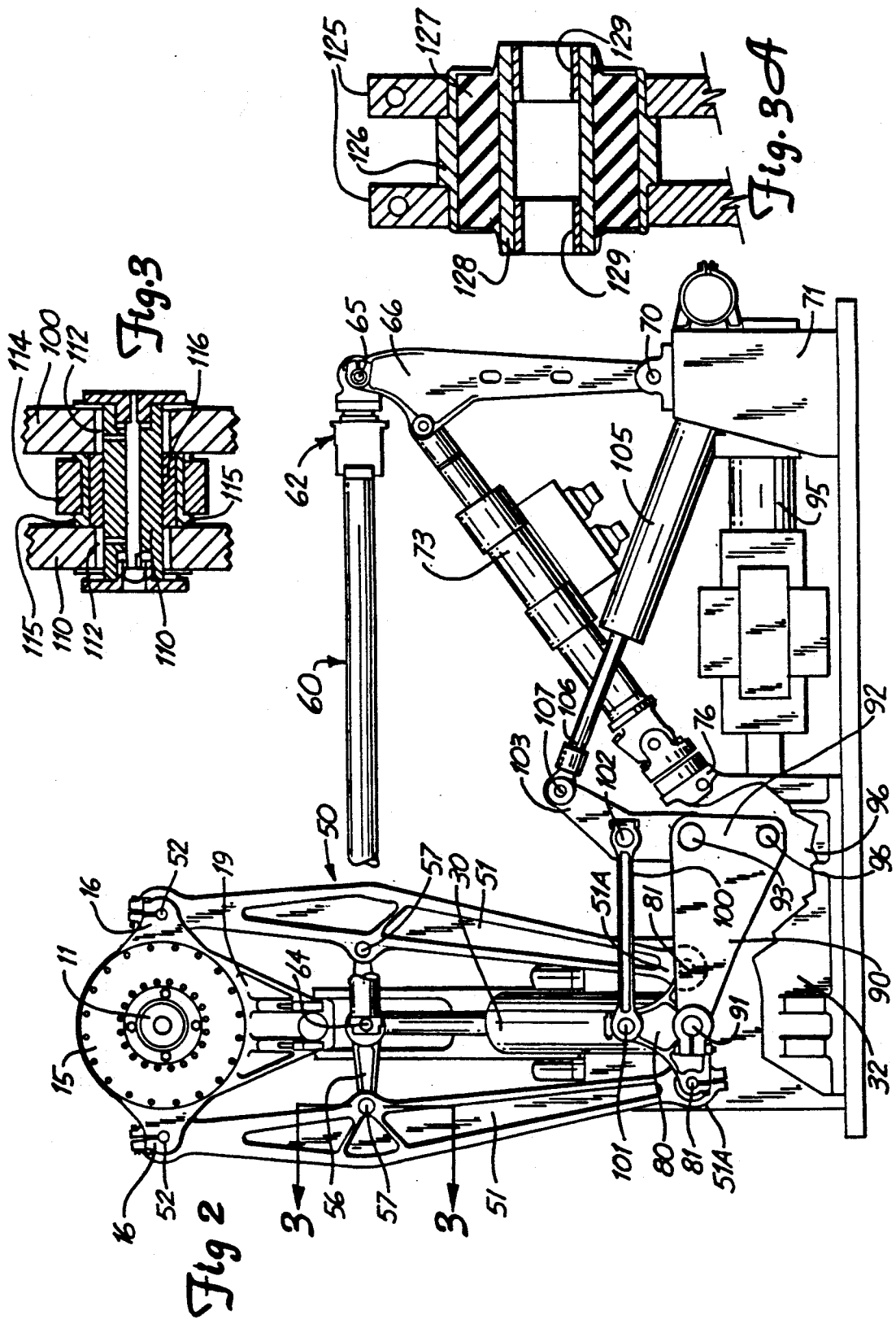

LINKAGE FOR VEHICLE SIMULATOR

BACKGROUND OF THE INVENTION

The present invention relates to a loading linkage for testing vehicle suspension systems that will apply a brake torque at relatively high load levels and reduces the mass carried by the test fixture.

U.S. Pat. No. 4,733,558 illustrates a brake torque loading linkage fixture that is substantially similar to the present invention in concept and basic loading arrangements. However, when the linkage shown therein has to be increased in size sufficiently to accommodate higher loads for larger vehicles, the mass becomes very high and makes precise control more difficult.

SUMMARY OF THE INVENTION

The present invention relates to the linkage for brake torque loading used in a vehicle wheel spindle testing device that applies adequate brake torque load for test systems, while being reduced in overall length and size and providing a mechanical loading advantage for applying braking loads to a spindle load adapter. The reduced size also results in a reduced mass of the fixture.

The brake torque loading linkage is a unit that does not affect the loading in vertical, longitudinal or lateral directions, but when actuated will tend to rotate the spindle load adapter while the test specimen brake is applied, to simulate loads occurring during actual vehicle operation. There is a slight cross-talk of longitudinal input motion to brake motion.

BRIEF DESCRIPTION OF THE DRAWINGS

FIG. 1 is a fragmentary perspective view of a wheel spindle loading linkage having a brake torque linkage made according to the present invention installed thereon;

FIG. 2 is a side elevational view thereof as viewed from an opposite side of the loading device from FIG. 1; and FIGS. 3 and 3A are a sectional views illustrating typical flexure mounts for the pivot members used for mounting various linkages.

DETAILED DESCRIPTION OF THE PREFERRED EMBODIMENTS

As was stated, the overall configuration of the present device is similar to that shown in U.S. Pat. No. 4,733,558, and constitutes an improvement in that structure by reducing the amount of mass that must be moved during vertical movement, in particular. Vertical movement is the largest displacement motion in the testing of vehicle front wheels. For light truck testing, the suspension systems are heavier than automobiles, and that means that the test linkage that is used for applying the necessary test loads also has to be heavier.

Referring to FIG. 1 and the schematic representation thereof, a typical spindle loading assembly is indicated generally at 10 which is designed for testing a wheel spindle and hub indicated schematically at 11. The associated parts include the brake rotor disk 11A The spindle is mounted onto a suitable spring support 11B on an automobile (not shown), and the test apparatus will stimulate loading the spindle against the spring load relative to the mass of the vehicle body. The test fixture can be mounted directly onto a wheel hub on a vehicle so that the suspension is tested in place in a known manner. There is a substantial amount of vertical movement during vertical loading. The spindle and hub assembly 11 is mounted to a wheel adapter housing 15 which in turn has the spindle and hub assembly 11 mounted thereto through, the wheel bolts. Suitable adapters can be used for the mounting.

Rotation of hub and thus of the wheel adapter housing 15, can be restrained by clamping and holding a brake disk 11A, which is fixed to the wheel hub in a conventional manner. The disk shoes and housing are indicated at 13. The brake actuator 13A can be actuated to actuate the brake pads to hold the conventional brake disk 11A from rotating, and thus restrain the wheel adapter housing 15 from rotating.

The wheel adapter housing 15 is a rigid housing that has front and rear ears 16 thereon. The ears 16 are each connected to a separate one of a pair of vertical loading links, which will be subsequently identified. The wheel adapter housing 15 has an integral downwardly extending bracket portion 19. A lateral load input link 20 is pivotally connected to the bracket 19 as at 21, and the opposite end of the lateral input link 20 is connected with a pivot pin 22 to one attachment point of a bell crank assembly 23. The opposite end of the bell crank assembly 23 is connected with a pivot pin 25 to a pedestal 26 that in turn is supported on a base 27. The base 27 is a massive block used for supporting the entire test fixture.

The bell crank assembly 23 is operated to load the lateral input link 20 using a lateral input actuator 30, that has its base end connected as at 31 to a main support member 32. The support member 32 also supports linkages for vertical loading, as will be explained.

The rod end of actuator 30 is connected as at 35 to a pivot point or lobe on the bell crank 23, so that upon extending and retracting the rod of the actuator 30, the link 20 is loaded in tension and compression as desired, to in turn load the wheel adapter housing 15 parallel to the axis of a wheel which could be mounted on the spindle and hub assembly 11. The line of lateral force input from the link 20 is located at the level at which the tire on a wheel mounted on the spindle and hub assembly 11 would contact the road. The lateral input therefore simulates the lateral loading on a tire of a vehicle.

The type and amount of loading of the test specimen and wheel is programmed as is known in the prior art. Suitable controls and pressure sources indicated at 40 are used for operating the loading sequence. The controls are used to program all of the various actuators that are used with the present invention. The program input can include the desired loading sequences and loading forces and motion.

A longitudinal, or fore and aft, loading linkage, as well as the vertical loading linkage can also be seen in FIG. 2, which is a view from the opposite side from the perspective view of FIG. 1. A vertical load assembly indicated generally at 50 has a pair of vertically extending loading links or struts 51 that are coupled to the ears 16, on the fore and aft sides of the wheel adapter housing 15. The links or struts 51 fit between bifurcated portions of the respective ears 16 and are pivotally mounted to the ears with suitable pins 52. The connections between the ends of the vertical loading links or struts 51 and the spaced-apart ear portions 16 at the front and rear of the load adapter housing are free pivoting about the axis of the pins 52, and also include an elastomeric bushing hub mounting to permit limited spherical motion of the links in addition to pivoting relative to the ears 16. The pivot pins 52 are spaced apart in fore and aft direction, as can be seen.

The links or struts 51 are coupled together in their midportions with a cross link 56 that has its opposite ends mounted for pivoting movement on pins 57 to the respective links or struts 51. Again, the connections of the pins 57 are made so that they will pivot freely about the axes of the pins. The link ends are connected to the pivot pins themselves through elastomeric bushing members for permitting limited spherical motion of the link in addition to pivoting relative to the struts or links 51. The cross link 56 has a hub in its center portions, and a longitudinal loading link assembly 60 is pivotally connected with a pivot pin 64 to the hub on link 56. The longitudinal loading link assembly 60 comprises two spaced links that are connected together at their ends opposite from pin 64 with an adapter 62 that has a connection end 63 pivotally connected as at 65 to a bell crank 66. The various pivots of the actuator and links have elastomeric mounts at the pivots to permit some spherical motion as well as pivoting. The bell crank 66 has an opposite end portion, pivotally connected as at 70 to a support pedestal 71. A servo actuator 73 has its rod end connected as at 74 to an ear or connecting lobe on the bell crank 66. The base end of the actuator 73 is connected to a bracket assembly 76 that is supported on the main support 32.

The lower end of the vertical loading links or struts 51 are joined with a delta-shaped (triangular) bell crank 80 that is mounted between the lower end portions 51A of the vertical struts. The bell crank 80 is made of a hollowed-out (bifurcated) structural casting so the lower ends of links 51 fit between the ends of the casting forming the bell crank 80. The two links 51 are connected to the bell crank 80 at pivots shown at 81. The pivots 81 are spaced in longitudinal (fore and aft) direction an amount less than the spacing between the pivots 52, 52 at the upper ends.

The pivots 81 are free pivoting pins at the respective ends of the struts 51, 51, but the pivots also are mounted through elastomeric bushing members that will permit flexing laterally of the pin axes. The bell crank 80 is movable in a vertical direction to apply vertical loads simultaneously to both of the struts or links 51. The bell crank 80 is mounted on a bell crank arm assembly 90 which comprises two spaced-apart plates that move as a unit, and these plates have outer ends that are connected with a pin 91 that passes through the center of the bell crank 80. The bell crank arm assembly 90 in turn has an actuating arm portion 92 and is supported on the main support member 32 with a pivot pin 93. The outer end of the actuator arm 92 is connected to a vertical actuator 95 that has its rod end connected as at 96 to the outer end of the actuating lever portion.

The actuator 95 is a double acting, servo controlled hydraulic actuator and has its base end connected to the pedestal 71. Extension and retraction of the rod of actuator 95 causes the pin 91 and thus the bell crank 80 to move invertical direction to load both links or struts 51 and in turn apply loads to load adapter housing 15 through the ears 16. The distance between pins 81 is substantially smaller than between pins 52. The linkage is kinematically over constrained, in that the center link also is pivoted to both links or struts 51.

In order to apply a braking torque on the adapter housing 15, it is necessary to put a torque load on the load adapter housing 15 when the brake 13 is being clamped. The torque is applied by pivoting the bell crank assembly 80 about its central pivot pin 91 and cause differential vertical movement between the links or struts 51. Control links 100 are pivotally connected as at 101 to the upper end of the bell crank 80, at points that are spaced above the plane passing through the pivot axes of pins 81, 81 and the pivot axis of pin 91. The rear portion of the links 100 are pivotally mounted as at 102 to an actuator lever 103. The actuator lever 103 has one end pivotally mounted on the same pivot axis as the bell crank assembly 90, that is, at the pivot axis of pin 93. The lever 103 is mounted with respect to the main support 32 for pivotal movement.

The lever 103 is controlled with a servo controlled hydraulic actuator 105 that has an extendable and retractable rod 106. The outer end of rod 106 is connected to the lever 103 with a pivot pin 107. The base end of the actuator 105 is connected to the pedestal 71, and upon movement of the actuator rod 106, the lever 103 will cause pivotal movement of the bell crank 80 relative to the bell crank arm assembly 90 about pin 91, to cause one of the links or struts 51 to move vertically upwardly, and the other link or strut 51 to move vertically downwardly, thereby applying a torque load to adapter 15 about the axis of the hub and the spindle in the hub. The brake torque loading can be controlled through suitable servo controls, and the torque actuation is similar to that shown in U.S Pat. No. 4,733,558, except that the bell crank 80, which replaces the actuator bar in U.S. Pat. No. 4,733,558, is substantially shorter and lighter than the previously used actuator bar, so that the overall moving mass that is moved when the bell crank arm assembly 90 is oscillated vertically is reduced.

It also can be seen that the line between pivot points 101 and 102 of link 100 is parallel with the line between the pivot points 91 and 93 of the bell crank arm assembly 90. This is a parallelogram linkage, so there will not be any brake torque input as the bell crank arm assembly 90 is operated to load the struts 51 vertically. The parallel linkage action of the control link 100 with respect to the pivot points 93 and 91 of the bell crank arm assembly 90 maintains the bell crank 80 oriented in position in space so that during vertical movement of the linkage no moment will be applied to adapter 15 about the spindle 11 unless the actuator 105 is operated.

All of the pivot pin connections at 52, 57, 64, 65, 16, 22, 21, 107 and 81 are fitted with pins mounted in freely rotating bearings in one member that is joined together with a second member so the pins rotate easily about the pivot axes of the respective pins. The mounting of the second member to the outer surface of the pin is through an elastomeric bushing that in turn is mounted to the respective hub member of the second member. This permits free rotation of the pins when pivoting while the elastomeric bushings permit a small amount of deflection between the pins and one of the hubs connected laterally of the pivot axes, thus accommodating some linkage deflection.

As shown in FIG. 3, a typical connection at each pivot of the links or struts 51 and the respective cross link 57 includes a pair of side members 110 formed by a bifurcation of one link (as shown link 51). A pivot pin 111 is mounted in the side plates 110 through bearings 112 for free rotation. The hub 114 of the joining link has an inner sleeve 115 secured to an elastomeric bushing 116. The inner bore of the elastomeric bushing 116 engages the outer surface of pin 111. The pin freely rotates about its axis in bearings 112 for pivoting, while the hub 114 and its respective cross link can twist about an axis perpendicular to the pivot pin axis a limited amount. Slight end clearance is provided between the plates 110 and the inner sleeve 115.

FIG. 3A illustrates a modified pivot connection for pivots such as 16, 21, 22, 64, 65 and 81. The central member of the pivot is shown typically at 125. It supports an outer housing 126 having an elastomer sleeve 127 under the sleeve. A bearing tube 128 passes through the elastomeric sleeve and can be bonded to the elastomer. The tube 128 carries bearings 129 that mount a pivot pin for rotation. The pivot pin connects the second member to the first member through the elastomeric sleeve, which permits limited twisting while permitting free pivoting. The pivot connection at pivot 107 uses the same type of connection but is slightly modified.

The rotatable joints at 52, 57 and 81, holding the struts 51, 51 to ears 16, to the link 56, and the bell crank 80, form a kinematically overconstrained linkage, that is, the number of links is in excess of the degrees of freedom. In such a case, in a classical analysis, the links 51 can move relative to each other only by deforming one or more of the connected links. In the proportions used in this device, the connected links are deformed very slightly as the linkage to apply brake torque loads operates, but due to careful arrangement of the proportions of the links, and the locations of the pivot points 57, the deformation is reduced to extremely small amounts throughout the angles of motion required for tests of suspension systems. Generally speaking, the total amount of brake torque movement of the housing 15 about its axis of rotation, which is the axis of rotation of the spindle, is 20° (10° in either direction from a centered position). The linkage will permit operation in a range of plus or minus approximately 25°.

For example, of the amount of deflection of the arrangements, the links or struts 51 are required to flex an amount less than 0.002 percent of the length of these struts to accommodate the over constraint at a 20° rotation of wheel adapter housing 15. Since brake input rotation is generally in the range of 10° in either direction, the actual deflection is normally less than that which occurs at 20° pivoting. It should be noted that the links 51 are normally stressed as beams (lateral loads perpendicular to the pivot axes) from the inputs of the longitudinal loading link 60 to an amount which will deflect the links or struts 51 laterally approximately 0.25 percent of their length. That, of course, is in bending between the opposite ends of the links or struts 51. Note, therefore, that the deflection due to over constraint is less than one percent of the deflection due to normal loading from other sources with the present device.

The span between pivot points 81, 81 is only 50% of the span between axes 52, 52 of the wheel adapter housing 15. The span between the upper ends of the struts 51, 51 is determined by the need to clear the brake mechanism and other features of the vehicle test specimen. In earlier designs, using parallel links or struts 51, 51, the span or spacing between the pivots at the lower end and the pivots at the wheel adapter housing 15 was equal. The reduced span between the pivot axes 81, 81, results in a more compact, lightweight structure for the bell crank 80. This factor is larger than might be estimated by casual inspection since very large loads are being carried by the element. The lighter weight of the present device results in a reduction of the coupled mass in the vertical direction of several pounds, which is a substantial reduction in a high performance linkage such as the loading linkage shown herein. The vertical movement required is substantial and the speed of movement also is substantial, so the inertial loads also are substantial.

The specific improvement is the use of a linkage which from both analysis and appearance appears to be over constrained, but which is operable due to a careful choice of proportion and locations of the kinematic elements so that there are minor deflections, but these deflections are minimized. The elastomeric mounts for the pivot bearings between the links or struts 56 eliminates stresses due to racking of the fixture from steer motion caused by the suspension geometry of the front wheel being tested.

By analysis the arrangement of the center link can be made to minimize deflection or the amount of over constraint. In one specific example, the spacing between the pivot points 52, 52 is 22 inches, and the spacing between the pivot points 81, 81 is 11 inches. In that arrangement, the space between the connection points 57, 57 was selected to be 15.82 inches to provide for the minimum amount of distortion. The length of each link 51 between pins 52 and 81 was 52 inches (perpendicular to the line between pins 52). The position of the plane of the axes of pins 57 was spaced 19.9 inches from the plane of the axis of pins 52 and 32 one inch from the axes of pins 81.

The amount of movement of the links or struts for about 30° pivoting of the lower bell crank 80 about pivot pin 91 can be calculated to determine the offset of the pivot pins 57 from the center lines of the links, using a suitable computer program. The drive (lower) ends of the links or struts 51, as shown, are spaced essentially one-half of the spacing between the attachment points of the link or struts to the wheel adapter housing 15.

The axes of pins 57 are slightly offset from the respective planes passing through the axes of pins 52 and 81 on each of the struts or links 51. The offset is selected to minimize deflection caused by the overconstraint.

The links 20 and 60 have load cells at their ends which are connected to the respective bellcranks for measuring loads applied, and the rod 106 of the actuator 105 also has a load cell at its outer end for determining loads applied.

Although the present invention has been described with reference to preferred embodiments, those skilled in the art will recognize that changes may be made in form and detail without departing from the spirit and scope of the invention.

What is claimed is:

1. A linkage assembly used to transfer rotary motion to a specimen which also is moved linearly in a first loading direction comprising:

two spaced longitudinal struts of substantially equal length, a plurality of more than two cross links extending between the struts, each of said plurality of cross links having first and second ends, the first and second ends of each of the plurality of cross links being pivotally connected to the two longitudinal struts, respectively, first and second of said cross links being pivotally connected to each longitudinal strut at opposite ends of said struts, the first and second ends of each of the plurality of cross links being connected to the respective struts with pivot joints that permit rotation of all of said cross links about generally parallel pivot axes, the pivot joints being compliant in radial directions from the pivot axes, the length of each of the plurality of cross links between the pivot axes at the respective first and second ends of the cross links being different from the lengths between the pivot axes of the first and second ends of all other cross links, and the struts being bendably compliant as the cross links are rotated about the parallel pivot axes to cause the struts to move differentially relative to each other in longitudinal direction; and means to rotate said first cross link about its pivot axes to obtain a mechanical advantage of rotation of the second cross link in inverse proportion to the ratio of lengths of the first and second cross links.

2. The linkage assembly as specified in claim 1 wherein the first cross link that is rotated is at a first end of the longitudinal struts and is shorter than the second cross link at a second end of said longitudinal struts, and means to apply a force to at least a third cross link of the plurality of cross links, other than the first and second cross links in a direction generally parallel to a line between the pivot axes connecting the additional cross link to the longitudinal struts at the first and second ends of said third cross link.

3. The linkage assembly of claim 2 wherein the first cross link is pivotally mounted on an end of an arm of a pivoting bell crank that move to longitudinally load both of the longitudinal struts simultaneously through the first cross link as the arm of the bell crank is moved.

4. The linkage assembly of claim 3 wherein the means to rotate the first cross link comprises a parallelogram linkage wherein the bell crank arm forms one link of the parallelogram linkage to restrain rotation of the first link as the bell crank moves the longitudinal struts simultaneously.

5. The linkage assembly of claim 2 wherein the third cross link is pivotally mounted to the respective longitudinal strut on pivot axes offset from planes defined by the pivot axes between the first and second cross links and each of the respective longitudinal struts.

6. The linkage assembly of claim 2 wherein the first cross link is substantially one-half the length of the second cross link.

7. The linkage assembly of claim 1 and connections of the respective cross links comprise separate pins pivotally mounted to one of the cross links at each of the pivot joints and elastomeric bushings between the respective pin and the associated struts at the respective pivot joints.

8. A linkage assembly used to transfer rotary motion to a body comprising two spaced longitudinal struts of substantially equal length, a plurality of more than two cross links of unequal length extending between said longitudinal struts, said cross links each having first ends pivotally connected to one longitudinal strut and second ends pivotally connected to the other longitudinal strut with pivot joints that permit relative rotation between the ends of said cross links and said struts about generally parallel pivot axes;

means to apply a torque to rotate a first of said cross links which is pivoted to the longitudinal struts at first ends of the longitudinal struts about axes parallel to the pivot axis at each end of said first cross link, the first cross link being substantially shorter than a second cross link at second ends of said longitudinal struts to obtain a mechanical advantage for loading the second cross link in torque as the first cross link is rotated, the torque on the second cross link being of magnitude generally equal to the torque applied to the first cross link multiplied by the ratio of the length of the first cross link to the length of the second cross link; and a pivoting bell crank supporting the first cross link and being movable to move both of said longitudinal struts simultaneously through the first cross link.

9. The linkage assembly of claim 8 wherein said plurality of cross links includes a third cross link pivotally connected to the longitudinal struts at a position between the first and second cross links, said third cross link being longer than the first cross link and shorter than the second cross link, between the pivot axes for the third cross link connection the third cross link to the longitudinal strut, the third cross link pivot axes to the respective longitudinal struts being offset from first and second planes defined by the pivot axes of the first and second cross links at each respective strut an equal amount.

10. The linkage assembly of claim 9 wherein the third cross link has its pivot axes at each of its opposite ends positioned between the planes defined by the pivot axes of the first and second links on the respective longitudinal struts.

11. The linkage assembly of claim 10 and means to apply a force to said third cross link generally parallel to a line between the pivot axes at the first and second ends of said third cross link.

12. The linkage assembly of claim 11 wherein the means to supply a torque to rotate the first cross link is operable to apply a torque in both directions of rotation of the first cross link, and the length of the third cross link being selected to minimize the compliance of the longitudinal struts and the pivot connections during rotation of said first cross link.

* * * * *